(No Model.)
E. B. SAMPLE.
SPRING FOR VEHICLES.
No. 432,840. Patented July 22, 1890.
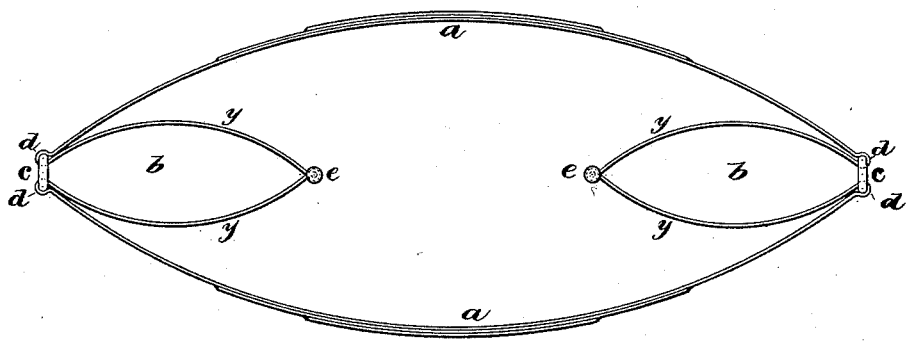
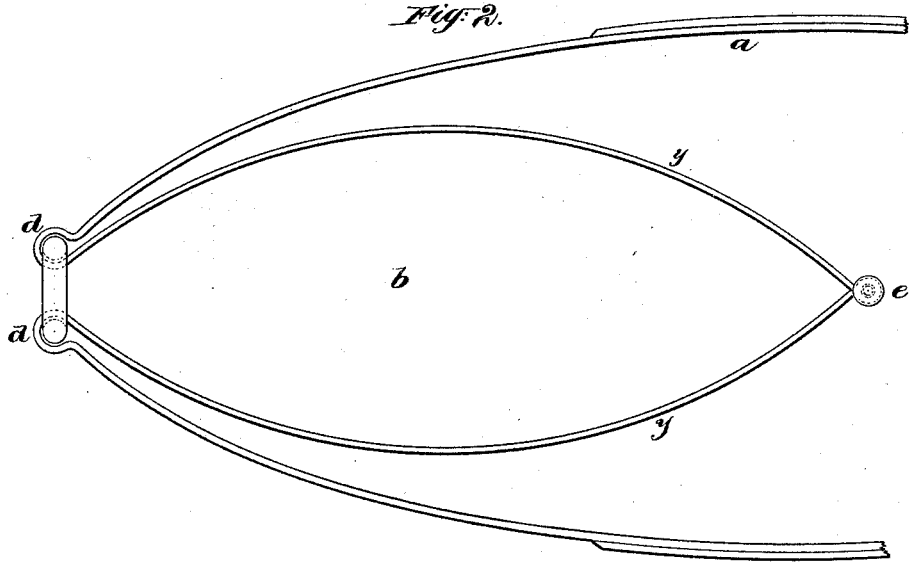
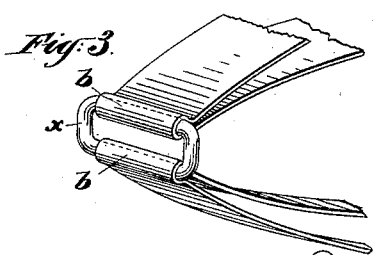
Witnesses:
Charles R. Searle,
Chas. S. Barber.
Inventor:
Erastus B Sample
by F. J. Mather
atty

UNITED STATES PATENT OFFICE.

ERASTUS B. SAMPLE, OF PENN YAN, NEW YORK.

SPRING FOR VEHICLES.

SPECIFICATION forming part of Letters Patent No. 432,840, dated July 22, 1890.

Application filed January 14, 1890. Serial No. 336,888. (No model.)

*To all whom it may concern:*

Be it known that I, ERASTUS B. SAMPLE, a citizen of the United States, residing at Penn Yan, in the county of Yates and State of New York, have invented a new and useful device—viz., a new and Improved Spring for Wagons, Carriages, Railroad-Cars, and other Vehicles, and for other uses to which the same may be advantageously applied—of which the following is a specification.

My invention relates to improvements in springs for the uses above set forth, and the objects of my improvements are, first, by means of an auxiliary spring to allow of a lighter main spring or set of springs than could otherwise be used, making a lighter vehicle; second, to secure a greater flexibility of spring and greater ease in riding than would be possible by any other device, and especially to secure a flexible action of the spring in a regulated manner reciprocally to the pressure superimposed thereon. I attain these objects by the device shown in accompanying drawings, in which—

Figure 1 is a vertical display of the entire device. Fig. 2 shows one end of the entire device where the main spring and auxiliary springs are seen to be united continuously and related. Fig. 3 shows the ring at the end of the entire device, flattened at the poles for more convenient fastening and connecting the leaf or leaves of the spring, respectively.

In Fig. 1, $a$ $a$ shows the main spring for a compound spring. $b$ $b$ show the auxiliary springs. At the points $c$ $c$ is shown the union of the auxiliary springs with the main spring. $d$ $d$ show the joints at the place of union of the springs, respectively. I prefer in use at the junction of the auxiliary springs and of the main spring, a metal ring, above described and shown in Fig. 3. (Marked X.)

In practice I prefer that the metal strip or leaf forming the foundation of the main spring $a$ $a$ shall be bent and continued around the metal ring, as shown at $b$ in Fig. 3, along the lines $y$ $y$, Fig. 1, to the point $e$, where the extremities of the leaves of the auxiliary spring are finally, respectively, clasped in the usual manner, thus forming of one continuous leaf the foundation-leaf of both the main spring and connected auxiliary spring. I may, however, terminate the leaf of the main spring at the points $c$ $c$, and also at the same points terminate the leaf of the auxiliary spring in the usual manner.

I am aware that compound springs have been used before—such as a spring within a larger spring—so related or connected that a perpendicular line drawn through the center of the auxiliary spring would be coincident with a perpendicular line drawn through the center of the main spring inclosing the former. This contrivance serves to increase the strength of the main spring, but tends to decrease the flexibility of the same, and also of the auxiliary spring, whereas in my invention no center line of an auxiliary spring would be coincident in perpendicularity with the center line of the main spring, and the flexibility of the spring, respectively, is thereby insured, while additional strength is gained, the pressure upon the springs, respectively, being so distributed and regulated that a certain reserve of flexible action is always maintained. The contrivance is such that flexible action of the main spring unites with the flexible action of the auxiliary spring with which it is connected gradually and increasingly as the pressure is increased, while the flexible action of the main spring is never much impaired, and the flexible action of neither is ever substantially exhausted in any ordinary usage.

I am aware, also, of the Letters Patent issued to Clark, August, 30, 1859, No. 25,246, which shows a rude form of compound spring; but it is evident that there never is and never can be any compound action or united action of the two springs, the action of each spring being entirely independent of the other. In Clark's invention the action begins with the auxiliary spring and continues until that spring is closed, when the action of the main spring begins and continues independently.

I am aware, also, of the Letters Patent issued to Walker, September 1, 1874, No. 154,731; but his invention also wants flexibility, the arm between the main spring and the auxiliary spring being practically rigid, and after a certain strain forming a stiffer equipment in riding than would be if there were no such contrivance. There is also very little union of action in the springs. I am not aware of any contrivance in compound springs producing so high a degree of flexibility heretofore being used.

What I claim as my invention, and desire to secure by Letters Patent, is—

The union of the parts $b\ b$ above described, as showing an auxiliary spring, with the parts $a\ a$ above described, as showing the main spring, both such parts, respectively, being connected and used in the manner and for the uses and purposes above set forth.

In testimony that I claim the foregoing as my invention I have signed my name, in presence of two witnesses, this 24th day of December, 1889.

ERASTUS B. SAMPLE.

In presence of—
E. S. LONG,
J. H. SHEPHERD.